United States Patent [19]

Tsukamoto et al.

[11] 4,424,980
[45] Jan. 10, 1984

[54] FRONT FORK FOR MOTORCYCLE OR THE LIKE

[75] Inventors: Shizumasa Tsukamoto, Iwata; Yoshihito Ieda, Fukuroi, both of Japan

[73] Assignee: Showa Manufacturing Co., Ltd., Tokyo, Japan

[21] Appl. No.: 338,875

[22] Filed: Jan. 12, 1982

[30] Foreign Application Priority Data

Jan. 13, 1981 [JP] Japan .................................. 56-3523
Jan. 14, 1981 [JP] Japan .................................. 56-4342

[51] Int. Cl.³ .............................................. B62K 25/08
[52] U.S. Cl. ..................................... 280/276; 188/287
[58] Field of Search ...................... 280/276; 188/287

[56] References Cited

U.S. PATENT DOCUMENTS 3,989,261 11/1976 Kawaguchi ........................ 280/276
4,015,835 4/1977 Schumacher et al. ............. 188/287
4,057,264 11/1977 Suzuki et al. ...................... 280/276

FOREIGN PATENT DOCUMENTS 1030568 5/1978 Canada .............................. 280/276

Primary Examiner—Joseph F. Peters, Jr.
Assistant Examiner—Kenneth R. Rice
Attorney, Agent, or Firm—A. W. Breiner

[57] ABSTRACT

A front fork assembly for use in a motorcycle or the like, in which an inner cylinder is slidably fitted in an outer cylinder is described. Either the inner cylinder or an auxiliary cylinder having a predetermined length and fitted to the inner wall of the lower portion of the inner cylinder is slidably fitted in a sheet pipe which is anchored at the bottom portion of the outer cylinder and which is equipped with an auxiliary piston at the leading end thereof. The sheet pipe has its lower portion formed with an oil port at the side thereof, whereas the sheet pipe has its upper portion formed with an orifice at the side thereof. The inner cylinder also has its lower portion formed with an oil port at the side thereof and its upper portion formed in the axial direction with one or plural orifices. In an alternative, the aforementioned cylinder is formed with a plurality of orifices at a predetermined spacing from each other and with an oil port below those orifices. By the front fork having the construction as described, the attenuating force at an extension stroke can be stepwise changed in accordance with the position of the main piston which is fitted in the leading end of the inner cylinder.

7 Claims, 7 Drawing Figures

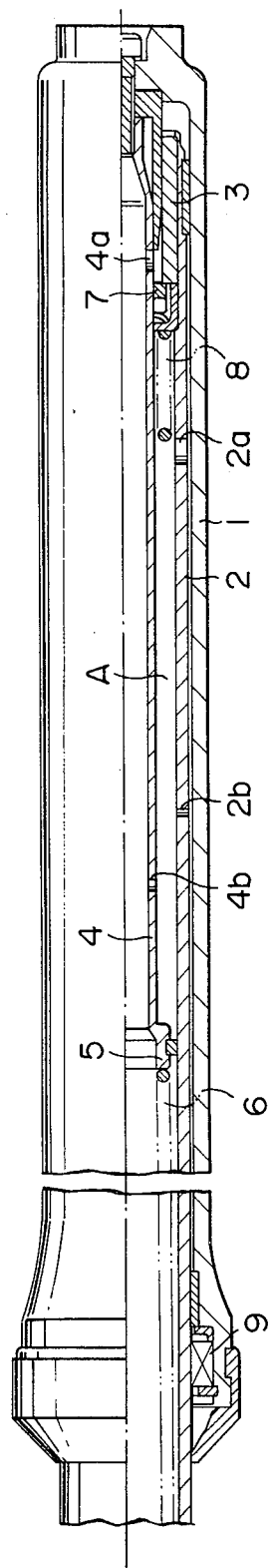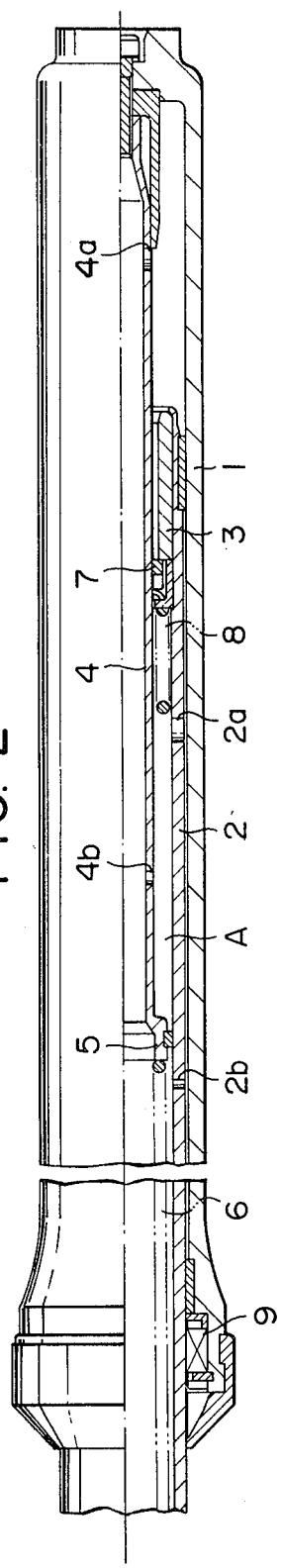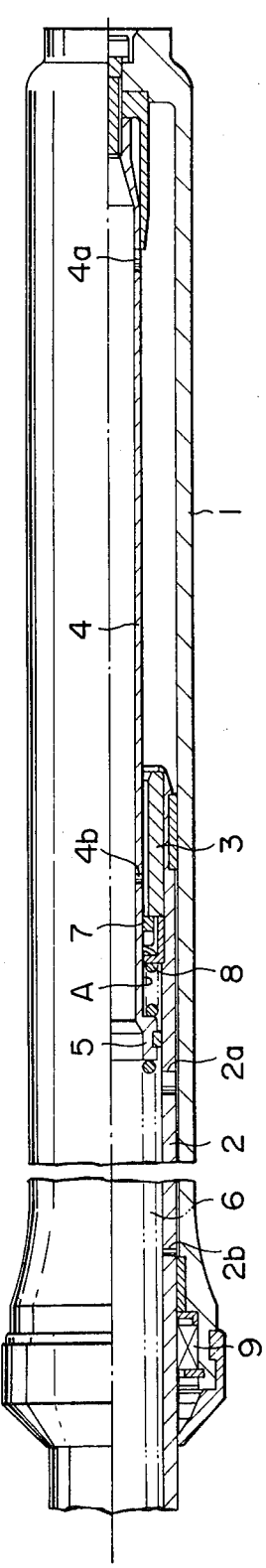

FRONT FORK FOR MOTORCYCLE OR THE LIKE

BACKGROUND OF THE INVENTION

1. Field of the Invention

The present invention relates to a front fork for use in a motorcycle or the like, in which an inner cylinder is slidably fitted in an outer cylinder, and, more particularly, to a front fork of a motorcycle or the like, which has its attenuating force at an extension stroke changed stepwise in accordance with the position of a main piston fitted in the leading end of the inner cylinder.

2. Description of the Prior Art

The front fork for use in a vehicle such as a motorcycle is designed to weaken its attenuating force to thereby have a soft shock absorbing effect in case the stroke (i.e., displacement) is small with respect to the position of the main piston when the motorcycle stops. In case that stroke is large, on the contrary, the front fork is required to strengthen the attenuating force at the beginning of the extension stroke thereof to thereby prevent an abrupt extension and to stepwise weaken the attenuating force to thereby restore it to its original state. This is acomplished by having a spring disposed under extension in the inner cylinder which is compressed to have its extending force increased.

SUMMARY OF THE INVENTION

It is, therefore, an object of this invention to meet those requirements and to provide a front fork for use in a motorcycle or the like, in which an attenuating force at an extension stroke is automatically changed in accordance with the position of a main piston fitted in the leading end of an inner cylinder.

The front fork according to the present invention is characterized in: that an outer cylinder is slidably fitted in an inner cylinder mechanism having a main piston at the lower end thereof; that the inner cylinder mechanism is fitted in a sheet pipe which is anchored at the bottom portion of the outer cylinder and which has an auxiliary piston at the lower end thereof; that the sheet pipe has its lower portion formed with an oil port at the side thereof; and that its attenuating force is stepwise weakened by orifice means for allowing the oil between the main and auxiliary pistons to flow therethough into the inner cylinder mechanism or the sheet pipe at the extension stroke of the front fork.

BRIEF DESCRIPTION OF THE DRAWINGS

FIG. 1 is a front elevation showing in partial longitudinal section one embodiment of a front fork according to the present invention at the most compressed state thereof;

FIGS. 2 and 3 are similar to FIG. 1 but illustrate the operations of the aforementioned embodiment as will be hereinafter explained;

DESCRIPTION OF THE PREFERRED EMBODIMENTS

Figure 4:
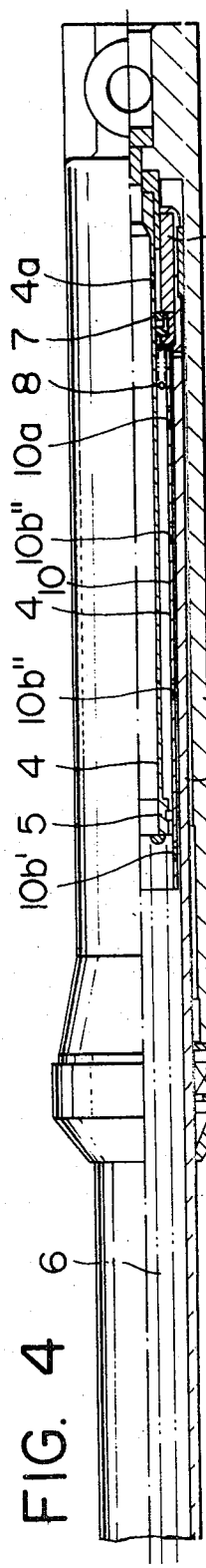
FIG. 4 is a front elevation showing in partial longitudinal section another embodiment of the present invention at the most compressed state thereof.

FIG. 1 shows one embodiment of the front fork according to the present invention and is a front elevation showing the same in partial longitudinal section in the compressed state i.e., having an inner cylinder inserted to its full stroke into an outer cylinder. In an outer cylinder 1 which connected to the axle of the front wheel of a motorcycle or the like, as shown, there is slidably fitted therein a main piston 3, which is disposed at the lower portion of an inner cylinder 2, such that it is filled with working oil. In the inner cylinder 2, moreover, there is slidably fitted an auxiliary piston 5 which is disposed at the upper end of a sheet pipe 4 anchored at the bottom portion of the outer cylinder 1. A spring 6 is sandwiched under extension between that auxiliary piston 5 and the upper portion of the inner cylinder 2 thereby to suspend the front portion of the motorcycle body. Moreover, the main piston 3 is equipped with a check valve 7 which is adapted to be opened during the downward stroke of the inner cylinder 2 and to be closed during the upward stroke. On the other hand, the sheet pipe 4 has its lower portion formed with an oil port 4a at the side thereof and its upper portion formed with an orifice 4b at the side thereof. The inner cylinder 2 also has its lower portion formed with an oil port 2a at the side thereof and its upper portion formed in the axial direction with an orifice 2b. Reference numerals 8 and 9 indicate a rebound spring and an oil seal, respectively.

The operations of the embodiment thus constructed will be described in the following.

First of all, at the beginning of the extension stroke, in which the front fork is extended and as a result the inner cylinder 2 is extended by the extending force of the spring 6 from the state having the spring 6 in the inner cylinder 2 fully closed, as shown in FIG. 1, the oil in the space A between the auxiliary piston 5 and the main piston 3 operates in the direction to reduce its volume to thereby close the check valve 7 as shown in FIGS. 2 and 3. As a result, the oil in the space A flows into the inside of the sheet pipe 4 by way of the orifice 4b. At this time, an attenuating force is established to prevent the front fork from abruptly extending.

Next, when the orifice 2b of the inner cylinder 2 reaches a position above the auxiliary piston 5, as shown in FIG. 2, the oil in that space A flows from the oil port 2a by way of the clearance between the inner cylinder 2 and the outer cylinder 1 in addition to the preceding passage via the orifice 4b until it flows from the orifice 2b into the inner cylinder 2. As a result, the attenuating force at this time is made weaker than that at the beginning by means of those two orifices 2b and 4b. In other words, the extension becomes faster than that at the beginning so that the original state is restored. When the oil port 2a comes to a position above the auxiliary piston 5, moreover, the oil in the space A is confined therein, as shown in FIG. 3, to establish an oil lock, by which the extension of the front fork is abruptly depressed as well as by the action of the rebound spring 8. For such purpose, the oil port 2a is so arranged as to come a position above the auxiliary piston 5 at the longest extension stroke. The description of the embodiment under consideration is directed to the case in which the orifice 2b formed in the inner cylinder 2 is one. Nevertheless, the attenuating force can be stepwise changed at a lower rate by forming a plurality of orifices in the axial direction.

A second embodiment of the present invention will now be described in detail which reference to FIGS. 4 through 7, where the same elements as those of the aforementioned embodiment are indicated by the same reference numerals.

This second embodiment is difference from the foregoing embodiment of FIGS. 1-3 in that another cylinder 10 is interposed between the sheet pipe 4 and the inner cylinder 2 and in that the orifice at the side of the upper portion of the sheet pipe 4 is omitted. More specifically, the cylinder having a predetermined length is fitted in the inner wall of the lower portion of the inner cylinder 2 at a predetermined spacing in between, and the cylinder 10 has its lower portion formed with an oil port 10a at the side thereof and its upper portion formed in the axial direction with a plurality of (e.g., three, as shown) orifices 10b', 10" and 10b' which are arranged from the upper end portion thereof at a predetermined spacing between the adjacent two. Here, the effective area of the oil port 10a is made larger than the sum of the effective areas of the respective orifices 10b', 10b" and 10b'". On the other hand, the auxiliary piston 5, which is disposed at the upper end of the sheet pipe 4 anchored at the bottom portion of the outer cylinder 1, is slidably fitted in the aforementioned cylinder 10. Moreover, the sheet pipe 4 has its lower portion formed with the oil port 4a at the side thereof. In this case, the uppermost orifice 10b' is positioned above the auxiliary piston 5 when the inner cylinder 2 is the most fully compressed.

The operations of the second embodiment shown in FIGS. 4 through 7 will be described in the following.

Figure 5:
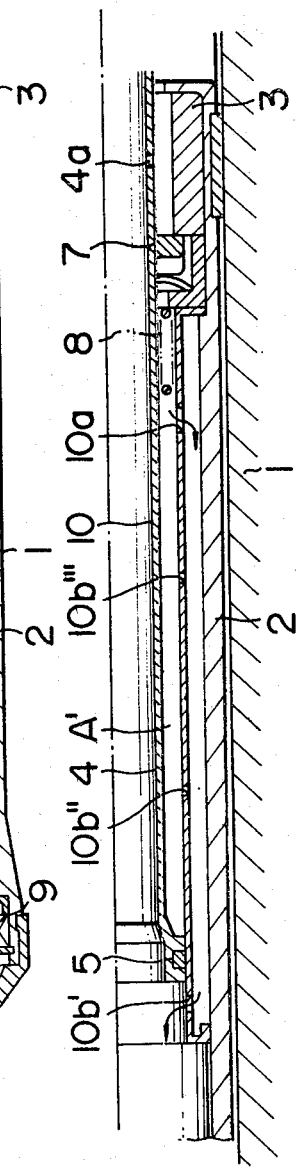
FIGS. 5 to 7 are similar to FIG. 4 but illustrate the operations of the embodiment shown in FIG. 4 as will be hereinafter explained.
Figure 6:

First of all, at the beginning of the extension stroke, in which the front fork is extended and as a result the inner cylinder 2 is to be extended by the extending force of the spring 6 in the cylinder 2 from the state having the spring fully compressed, as shown in FIG. 4, i.e., from the state having the essential portion shown in an enlarged scale in FIG. 5, the oil in the space A' between the sheet pipe 4 and the cylinder 10 operated in the direction to reduce its volume to thereby to close the check valve 7. As a result, the oil in the space A' mainly flows from the oil port 10a via the clearance between the cylinder 10 and the inner cylinder 2 until it flows from the orifice 10b' into the inner cylinder 2. At this time, an attenuating force is established to prevent the front fork from abruptly extending.

Figure 7:
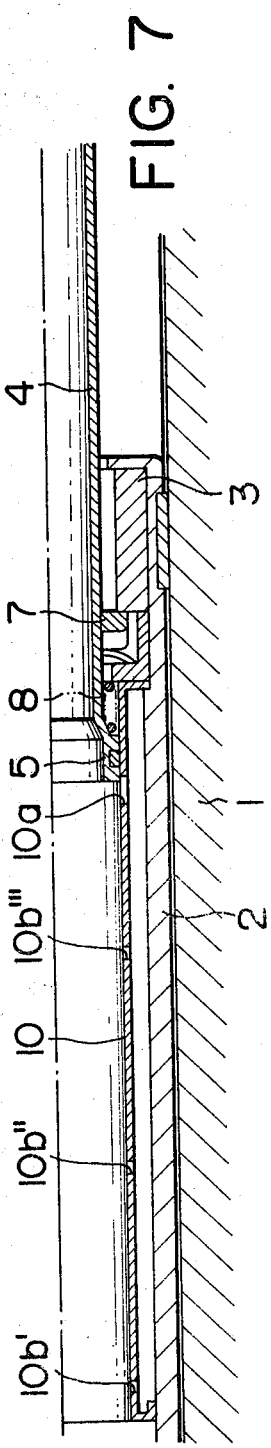

Next, when the orifice 10b" comes to a position above the auxiliary piston 5, the oil flows out of the orifice 10b", although it has previously only flowed out of orifice 10b' so that the attenuating force becomes weaker than that at the beginning. Likewise, if the oil begins to also flow out of the orifice 10b'", the extension is speeded up so that the original state is restored. Moreover, when the oil port 10a comes to the position of the auxiliary piston 5, the oil in the space A' is confined therein similarly to the foregoing embodiment, as shown in FIG. 7, to establish an oil lock, by which the extension of the front fork is abruptly depressed as well as by the action of the rebound spring 8.

By forming the cylinder 10 in that way with the plural orifices 10b', 10b" and 10b'" in the axial direction, the attenuating force can be stepwise changed at a low rate in accordance with the position of the fork pipe at the extending step of the inner cylinder 2.

As has been described in detailed hereinbefore, according to the present invention, the attenuating force, by which the extension is slow at the beginning but fast at the end, can be automatically established at the extending stroke of the front fork in accordance with the position of the main piston by the simple construction illustrated, in which the cylinder is fitted in the inner cylinder, thereby to advantageously provide a front fork which can ensure a comfortable ride.

What is claimed is:

1. A front fork suitable for a motorcycle comprising: an inner cylinder mechanism which includes a main cylinder and a main piston disposed at the lower end thereof; an outer cylinder slidably fitted to said inner cylinder mechanism; a sheet pipe anchored at the bottom portion of said outer cylinder and slidably fitted to said inner cylinder mechanism, said sheet pipe including an auxiliary piston disposed at the upper end thereof and having an oil port formed in the side of the lower portion thereof; and orifice means for allowing the oil between said main piston and said auxiliary piston to flow into one of said inner cylinder mechanism and said sheet pipe at the extension stroke of said front fork to thereby stepwise reduce an attenuating force; said orifice means including an oil port formed at the side of the lower portion of said inner cylinder mechanism, at least one orifice formed in the axial direction in the upper portion of said inner cylinder mechanism, and an orifice formed at the side of the upper portion of said sheet pipe.

2. A front fork according to claim 1, further comprising a rebound spring sandwiched between said main piston and said auxiliary piston for preventing a collision there between.

3. A front fork according to claim 1, wherein said main piston has a check valve adapted to be opened only at the compression stroke of said front fork.

4. A front fork according to claim 1, wherein said inner cylinder mechanism further includes an auxiliary cylinder fitted between said sheet pipe and said main inner cylinder, and wherein said orifice means includes a plurality of orifices formed in said auxiliary cylinder at a predetermined spacing from each other, and an oil port formed in said auxiliary cylinder spaced from said plural orifices in the direction of said main piston.

5. A front fork according to claim 4, wherein the uppermost orifice of said auxiliary cylinder is positioned above said auxiliary piston when the pressure in said inner cylinder is at its maximum.

6. A front fork according to claim 4, wherein the oil port of said auxiliary cylinder has a larger effective area than the sum of the effective areas of said plural orifices.

7. A front fork according to claim 4, wherein said main piston has a check valve adapted to be opened only at the compression stroke of said front fork.

* * * * *